United States Patent [19]

Asano et al.

[11] Patent Number: 4,671,223

[45] Date of Patent: Jun. 9, 1987

[54] SIDE MOUNTED V-TYPE 4-CYCLE ENGINE

[75] Inventors: Akira Asano; Kentaro Kato, both of Saitama, Japan

[73] Assignee: Honda Giken Kogyo Kabushiki Kaisha, Tokyo, Japan

[21] Appl. No.: 851,886

[22] Filed: Apr. 14, 1986

Related U.S. Application Data

[63] Continuation of Ser. No. 625,021, Jun. 27, 1984, abandoned.

[30] Foreign Application Priority Data

Jul. 7, 1983 [JP] Japan ............................ 58-105800[U]
Aug. 25, 1983 [JP] Japan ................................ 58-155991

[51] Int. Cl.[4] ............................................... F01L 1/02
[52] U.S. Cl. ............................... 123/90.31; 123/197 R
[58] Field of Search ............. 123/90.31, 197 R, 90.27, 123/195 A; 74/409, 15.63

[56] References Cited

U.S. PATENT DOCUMENTS

| | | | |
|---|---|---|---|
| 1,148,478 | 7/1915 | Jepson | 123/90.31 |
| 2,857,773 | 10/1958 | Slonek | 123/90.31 |
| 3,110,195 | 11/1963 | Hanley | 74/409 |
| 3,502,059 | 3/1970 | Davis et al. | 74/409 |
| 4,617,882 | 10/1986 | Matsumoto | 123/195 A |

FOREIGN PATENT DOCUMENTS 159904  10/1982  Japan ............................ 123/90.31

Primary Examiner—Craig R. Feinberg
Assistant Examiner—David A. Okonsky
Attorney, Agent, or Firm—Lyon & Lyon

[57] ABSTRACT

An engine of the V-type employing camshaft drive trains each including the crankshaft, two idle gear wheels held within a gear retainer and overhead camshafts. The idle wheels are of increasing diameter from the crankshaft to the camshafts. A transmission main shaft is placed relatively close to the crankshaft because of this arrangement. A backlash adjustment mechanism is employed with the mounting provided by the gear retainer. An eccentric journal portion of an axle allows adjustment through angular adjustment of the axle. A spring mechanism may provide appropriate torque on the eccentric axle mechanism to properly control backlash. Once properly positioned, the mechanism may be locked in place for normal engine operation.

7 Claims, 12 Drawing Figures

SIDE MOUNTED V-TYPE 4-CYCLE ENGINE

This application is a continuation, of applicaton Ser. No. 625,021, filed 6-27-84 and now abandoned.

BACKGROUND OF THE INVENTION

The field of the present invention is camshaft drive gear trains and particularly those employed on transversely mounted four cycle engines.

Transversely mounted engines as may be employed in a small vehicle and particularly in motorcycles or the like must be compactly arranged for advantageous vehicle design. One such transversely mounted engine arrangement is illustrated in FIG. 1 as being a V-type four cylinder engine with the arrow indicating the forward direction on the vehicle. The cross hatched plane illustrated between cylinders in the bank of cylinders illustrates the location at which the camshaft drive trains are arranged. One such drive train arrangement is specifically illustrated in FIG. 2 as including a crankshaft 10, first idle gear wheels 12 and second idle gear wheels 14. Thus, two idle gear trains, each including a wheel 12 and a wheel 14 are driven off of the crankshaft 10. In turn, the idle gear trains each drive two camshafts 16 and 18.

In such transversely mounted engines, the main shaft of the transmission is generally arranged parallel to the crankshaft and adjacent thereto. A main shaft 20 is illustrated in FIG. 2 as being displaced through a distance L. The crankshaft 10 is normally coupled to the main shaft 20 through a clutch arrangement and appropriate gearing.

Because the main shaft 20 also includes gear wheels and the like, the distance between centerlines of the crankshaft 10 and the main shaft 20 must be arranged such that clearance is provided between the engine and transmission components. Thus, L is often larger than would otherwise be necessary to accommodate the drive train components between the crankshaft and the main shaft of the transmission. One specific interfering component is the idle gear train of a camshaft drive train and, in particular, the first idler gear wheel 12 as can be seen in FIG. 2. Thus, the idle gear train for the camshafts in a transversely mounted V-type engine can result in an inefficient arrangement of components resulting in increased size of the engine/transmission unit.

A further difficulty has been encountered in the employment of an idle gear train for driving overhead camshafts. Unless very close tolerances are maintained on the gear wheels and the idle gear retainer, gear backlash can become a problem. One solution is to prepare a great number of gears falling within a less restrictive tolerance requirement which are then matched according to their actual size for employment in a camshaft drive train. Such a procedure is expensive and time consuming.

SUMMARY OF THE INVENTION

The present invention pertains to a camshaft drive train for a transversely mounted V-type internal combustion engine. A gearing arrangement is contemplated which allows the main shaft of the transmission to be placed closer to the crankshaft than would otherwise be allowed. To this end, the idle gear train forming part of the drive train for the camshafts includes gear wheels which are progressively larger in diameter from that nearest the crankshaft to that nearest the camshaft. The wheel nearest the crankshaft being smaller allows closer placement of the main shaft of the associated transmission. As a result, a more compact engine/transmission unit may be designed with substantial advantage in smaller vehicles and particularly motorcycles.

In another aspect of the present invention, backlash is reduced between idle gear wheels without requiring rigid tolerance requirements or a matching of gear wheels and idle gear retainers. An axle having a journal portion displaced from the centerline of the axle is employed with a means for adjusting the angular location of the axle in an idle gear retainer for rotatably mounting an idle gear. Because of the eccentric location of the journal, the axle may be rotated until a proper fit between idle gears is achieved. Appropriately spaced holes on both the idle gear retainer and the axle allow a pin retainer to be positioned so as to retain the axle in appropriate angular orientation for eliminating backlash.

Accordingly, it is an object of the present invention to provide an improved idle gear train for transversely mounted V-type internal combustion engines. Other and further objects and advantages will appear hereinafter.

DETAILED DESCRIPTION OF THE PREFERRED EMBODIMENT

Figure 1:
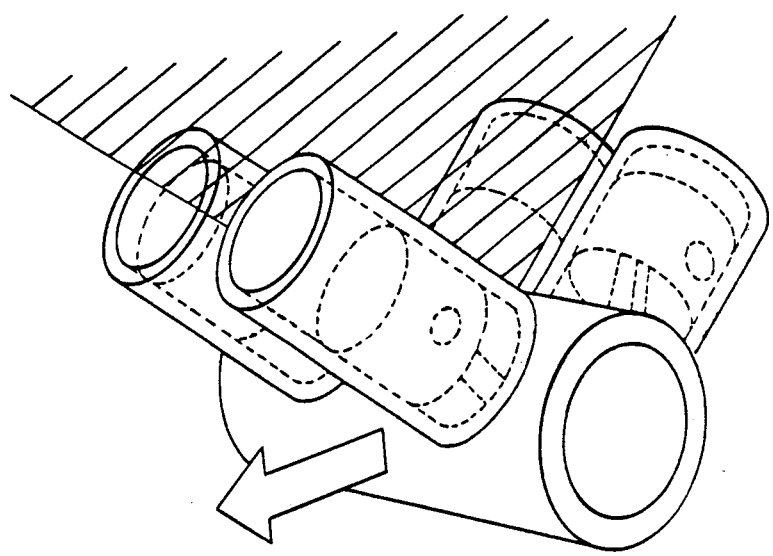
FIG. 1 is a schematic oblique view of a transversely mounted, V-type internal combustion engine.
Figure 2:
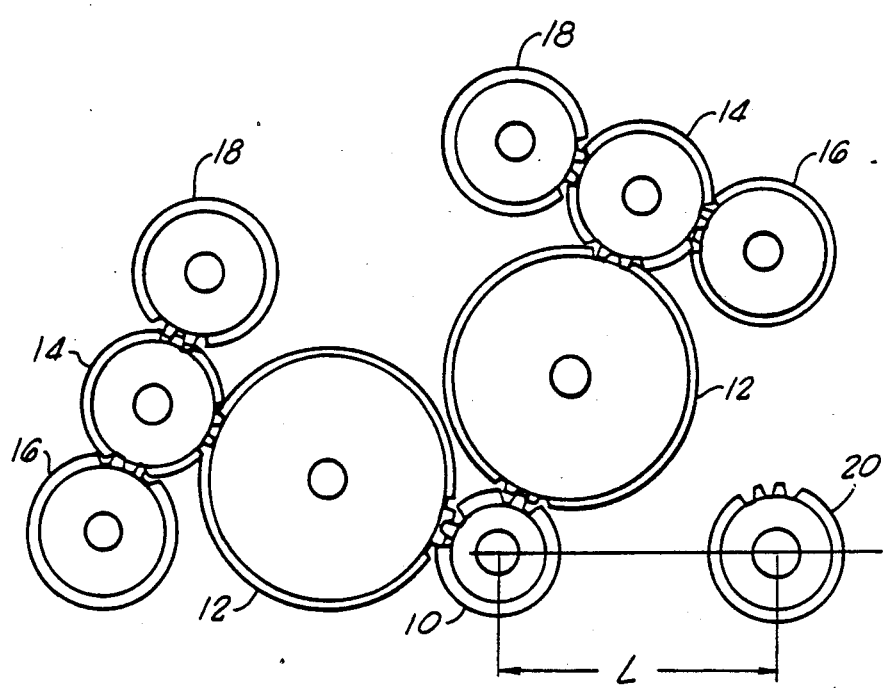
FIG. 2 is a schematic view of a drive train for overhead camshafts in a conventional engine.
Figure 3:
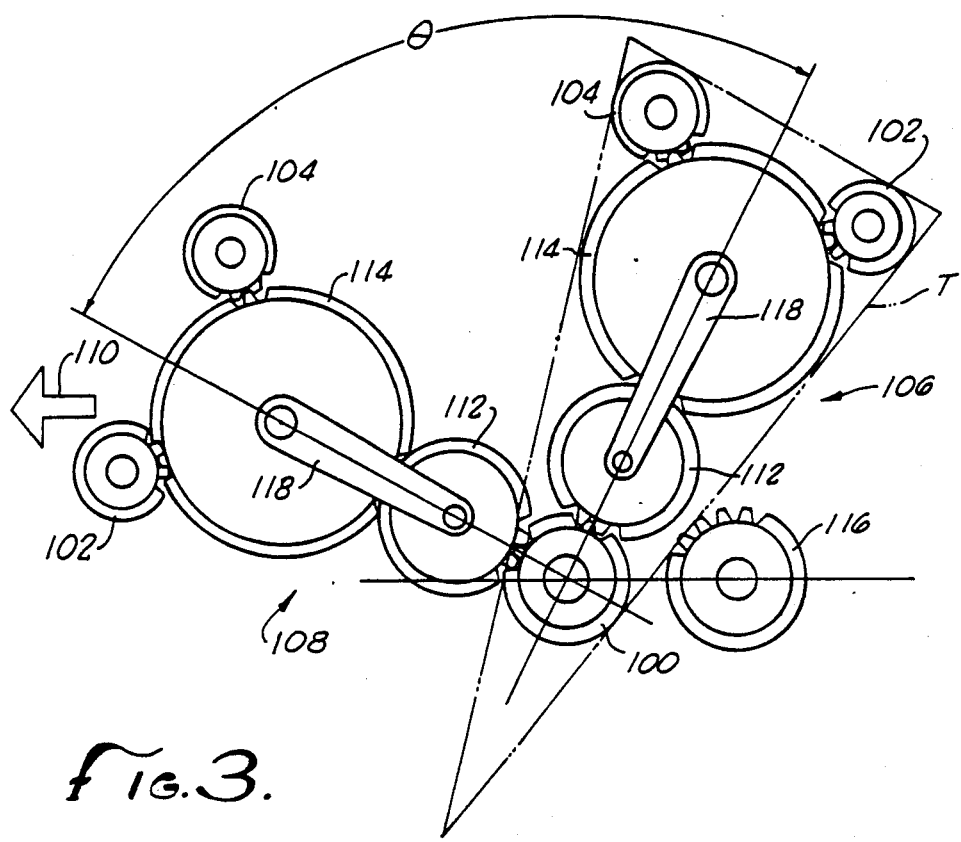
FIG. 3 is a schematic illustration of a drive train for overhead camshafts of the present invention.

Turning in detail to the drawings, FIG. 3 illustrates a gear train for driving overhead camshafts from the crankshaft. A crankshaft 100 drives two camshafts 102 and 104 through each of two idle gear trains 106 and 108. The gear trains 106 and 108 are disposed at an angle theta from one another as can be seen in FIG. 3 with the forward direction of the engine in the vehicle illustrated by an arrow 110. The gear trains 106 and 108 each include a first idle gear wheel 112 and a second idle gear wheel 114. The second idle gear wheel 114 is shown to be larger than the first idle gear wheel 112 creating a maximum profile as illustrated by the triangular envelope T. This arrangement with the gear wheels 112 being smaller than the gear wheels 114 is shown in FIG. 3 to allow placement of the main shaft 116 of the transmission much closer to the crankshaft 100. A comparison may be made between the spacing of the main shaft 20 from the crankshaft 10 in FIG. 2. Each idle gear train 106 and 108 also includes a gear retainer 118 to which the idle gears 112 and 114 are rotatably mounted.

Figure 4:
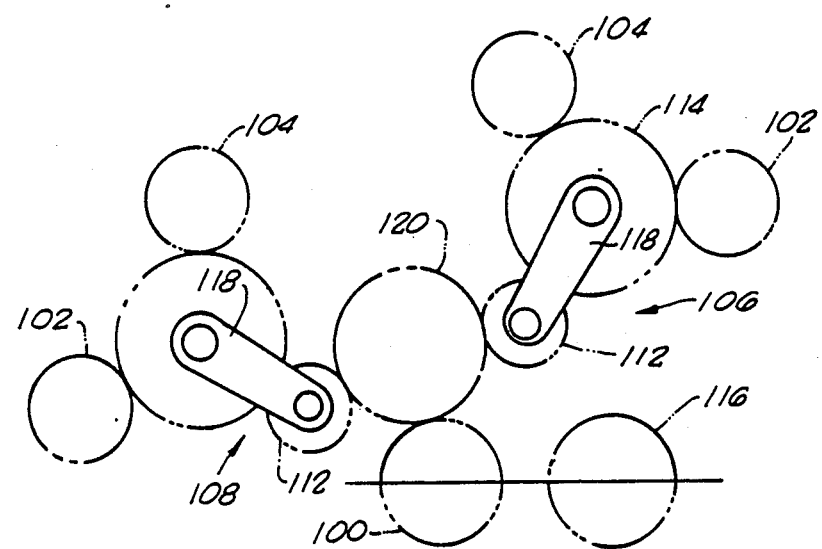
FIG. 4 is a schematic illustration of a modified embodiment of a drive train for overhead camshafts according to the present invention.

An alternate gear train arrangement is schematically illustrated in FIG. 4. The components which are identical or equivalent as illustrated in FIG. 4 to the components illustrated in FIG. 3 have the same reference numbers. Added to the gear train arrangement is an additional central gear 120. This gear 120 may be employed to vary the speed ratios between the crankshaft 100 and the camshafts 102 and 104. Additionally, an even smaller and laterally displaced first idle gear wheel 112 may then be employed to provide further clearance for the main shaft 116 of the associated transmission.

Figure 5:
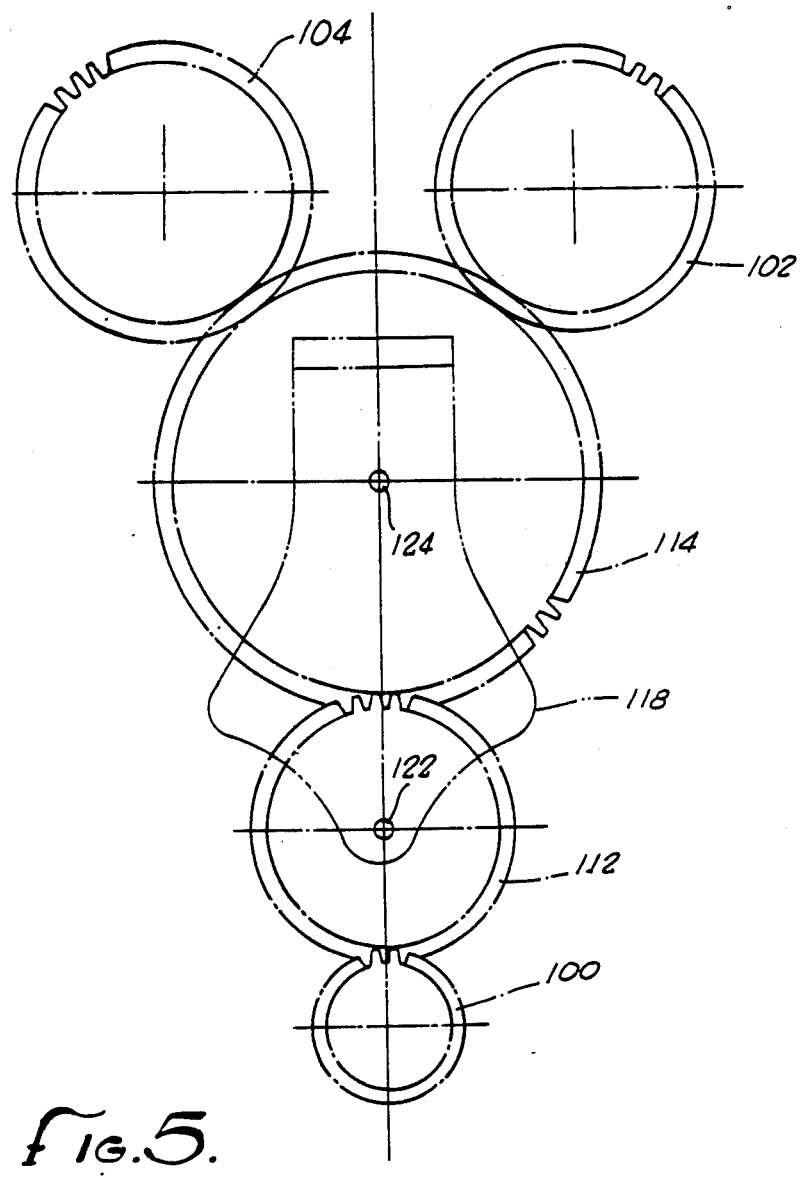
FIG. 5 is a schematic illustration of a drive train for an overhead camshaft.

Looking to the structure of the camshaft drive train, FIG. 5 illustrates an idle gear train assembly employing the same numerals as employed in FIGS. 3 and 4. A gear retainer 118 rotatably mounts idle gear wheel 112 and idle gear wheel 114 in engagement with one another. The actual dimension between axes 122 and 124 must be within a relatively restricted tolerance range relative to the radial dimensions of the wheels 112 and 114. By appropriately spacing the axes 122 and 124, backlash between gear wheels 112 and 114 can be substantially reduced.

Figures 6, 7:
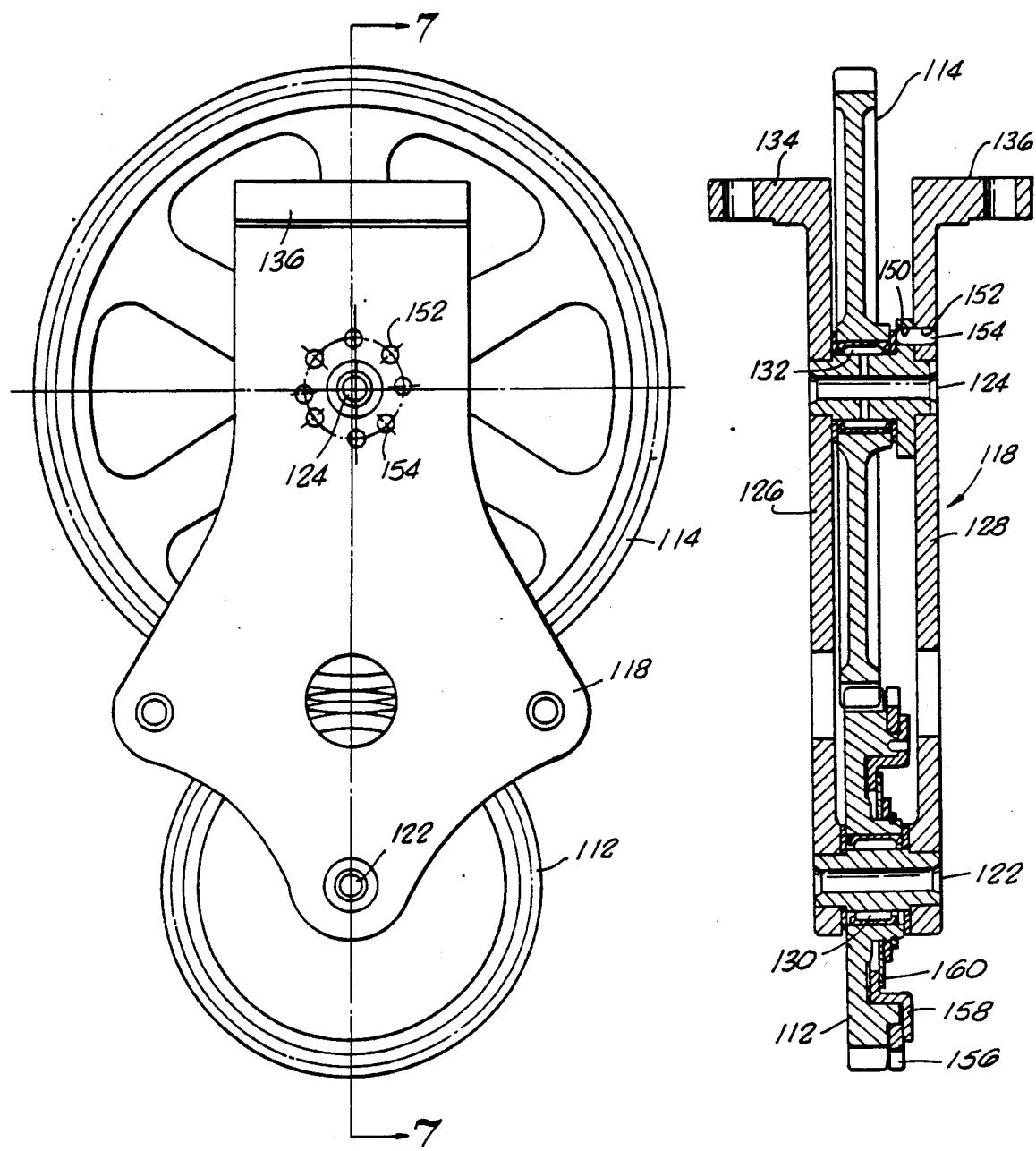
FIG. 6 is a side view of an idle gear assembly of the present invention.
FIG. 7 is a cross-sectional side view taken along line 7—7 of FIG. 6.

FIGS. 6 and 7 illustrate the details of an idle gear train of the present invention. Once again corresponding reference numerals are employed from the prior discussion. The gear retainer 118 is illustrated in greater detail as including two parallel plates 126 and 128 between which the gear wheels 112 and 114 are rotatably mounted. Axles 122 and 124 mount wheels 112 and 114, respectively. Each of the axles supports roller bearings 130 and 132 for low friction operation. The parallel plates 126 and 128 include flanges 134 and 136, respectively, for mounting the gear retainer 118 to the associated engine.

Figure 8:
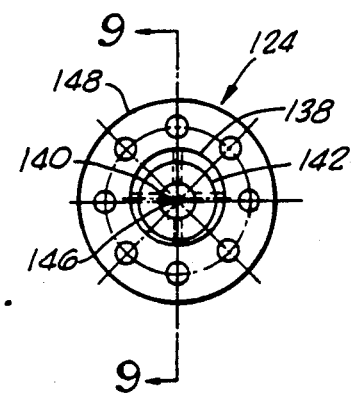
FIG. 8 is an end view of an axle of the idle gear assembly of FIG. 6.
Figure 9:
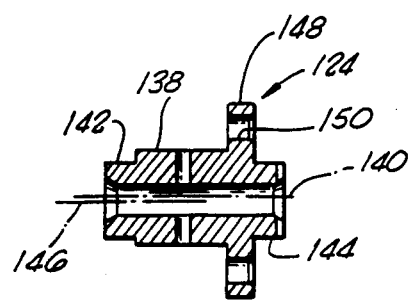
FIG. 9 is a cross-sectional elevation taken along line 9—9 of FIG. 8.

Looking specifically to the axle 124 as best illustrates in FIGS. 8 and 9, a central journal portion 138 includes a cylindrical surface extending about an axial centerline 140. This journal portion 138 provides the support for the wheel 114. At either end of the axle 124 are mounting portions 142 and 144. These mounting portions 142 and 144 also include cylindrical surfaces which are arranged about an axial centerline 146. The axle centerline 140 is displaced from the axial centerline 146 as can best be illustrated in FIGS. 8 and 9. The mounting portions 142 and 144 are arranged within holes provided in the parallel plates 126 and 128 as best illustrated in FIG. 7.

Also arranged on the axle 124 is a radially extending flange 148. Positioned symmetrically through the flange 148 are mounting holes 150. Eight such holes are illustrated arranged every 45° about the flange. The center of this hole pattern is at the axial centerline 146. Anchor holes 152 are positioned in one plate 128 of the gear retainer 118. The pattern of the anchor holes 152 is also coincident with the axial centerline 146. However, the anchor holes 152 are not evenly spaced about the pattern as are the holes 150. A pin 154 of sufficient sheer strength to resist twisting of the axle 124 is selectively located in an aligned hole 150 and anchor hole 152 to effect a means for retaining the journal portion 138 angularly positioned relative to the gear retainer 118. In this way, angular location of the axle 124 is selected and retained.

The orientation of the axle 124 is selected to reduce backlash as much as possible between the gear wheels 112 and 114. Thus, the axle 124 is rotated until the wheels come sufficiently close enough together to avoid such backlash. At this point, a pin 154 may be positioned in two aligned holes of the holes 150 and anchor holes 154. Because of the non-uniform spacing of the anchor holes 152, alignment or near alignment of an anchor hole 152 with a hole 150 is more likely. The pin 154 is preferably press fit into the holes such that it will be retained without additional fastening.

Albeit additional gear wheels in the drive train for the camshafts may include the foregoing mechanism, the backlash preventing mechanism associated with the wheels 112 may be employed. For proper engagement of the crankshaft 100 or intermediate idle gear wheel, an auxiliary gear wheel 156 is held against the gear wheel 112 by means of a plate 158 and a spring dish washer 160. The auxiliary gear wheel 156 has the same pitch radius as the gear wheel 112. However, the number of teeth do not match between the two gear wheels 112 and 156. Consequently, the effects of backlash are reduced or eliminated between the gear wheel 112 and the gear wheel associated therewith.

Figures 10, 11:
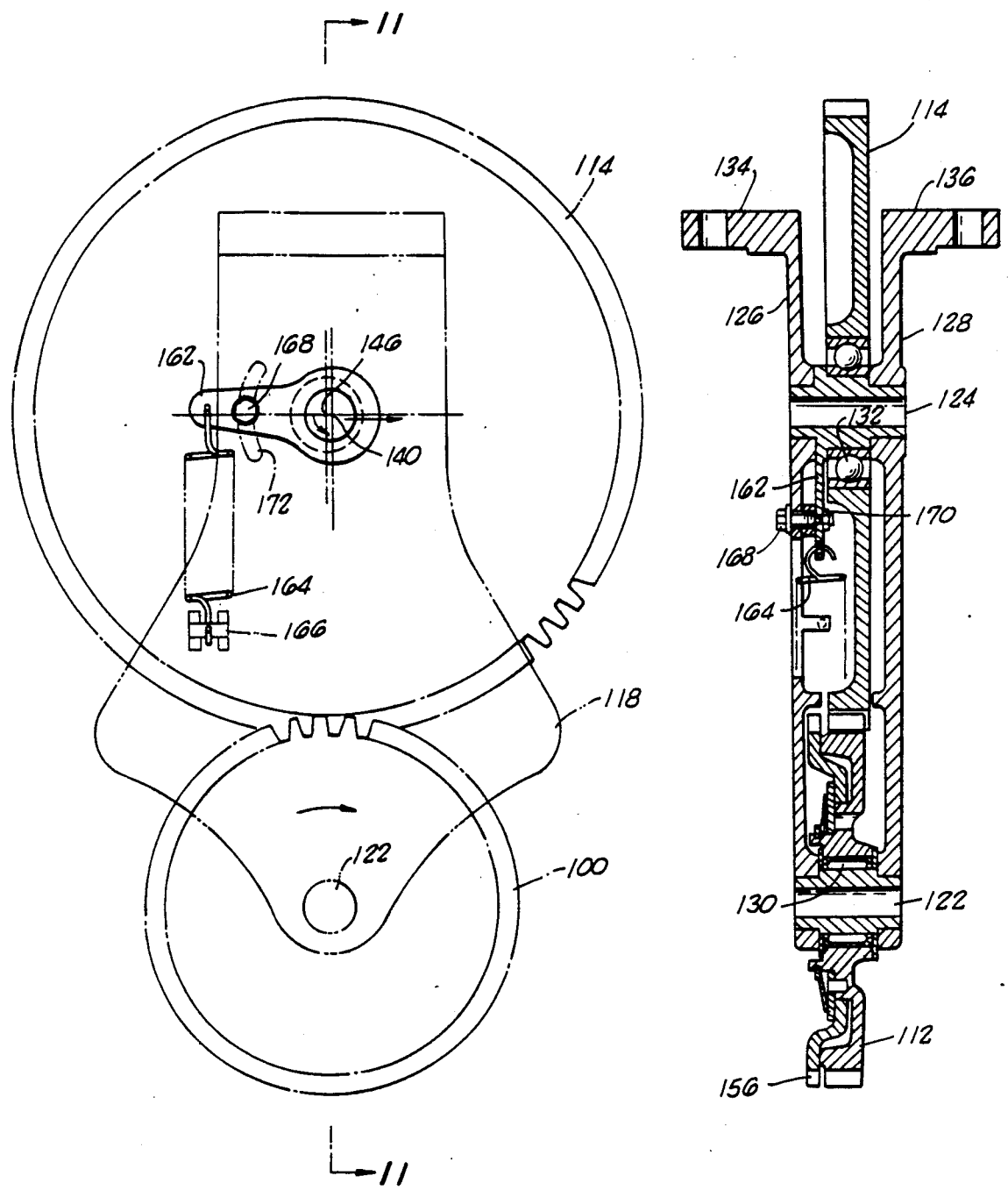
FIG. 10 is another embodiment of an idle gear assembly of the present invention.
FIG. 11 is a cross-sectional elevation taken along line 11—11 of FIG. 10.

Turning to the embodiment of FIGS. 10 and 11, the same reference numerals as previously employed are here employed for idential or equivalent components. The axle 124 includes, in addition to the eccentrically arranged journal portion, an arm 162 fixed to the axle 124. A spring 164 is coupled at a first end with the arm 162 and at a second end to a bracket 166. The spring 164 is arranged such that it is in tension to create a means for retaining the journal portion 138 angularly positioned relative to the gear retainer 118. The eccentricity of the journal portion of the axle 124 is positioned relative to the arm 162 such that the journal portion is drawn closer to the lower gear wheel 100 upon movement of the arm 162 downwardly under the force of the spring 164. Through a selection of tension upon the spring, the backlash is minimized through the automatic adjustment of the axle 124.

Once the relative positions of the gear wheels 100 and 114 are established through the operation of the arm 162 and spring 164, a locking bolt 168 and associated nut 170 are tightened to lock the arm 162 relative to the gear retainer 118. A slot 172 is provided for travel of the loosened lock bolt 168 which is affixed to the arm 162. The lock bolt arrangement is employed because of the varying load affecting the position of the axle 124. With the arrangement as illustrated in FIG. 10, power directed through gear wheel 100 will result in a force against the axle 124 toward the right. If the center 146 is below the center 140, the mechanism will tend to tighten the assembly. If the centerline 146 is above the centerline 140, deceleration may result in an overtightening of the assembly. Thus, permanent placement of the arm 162 for normal operation is desired.

Figure 12:
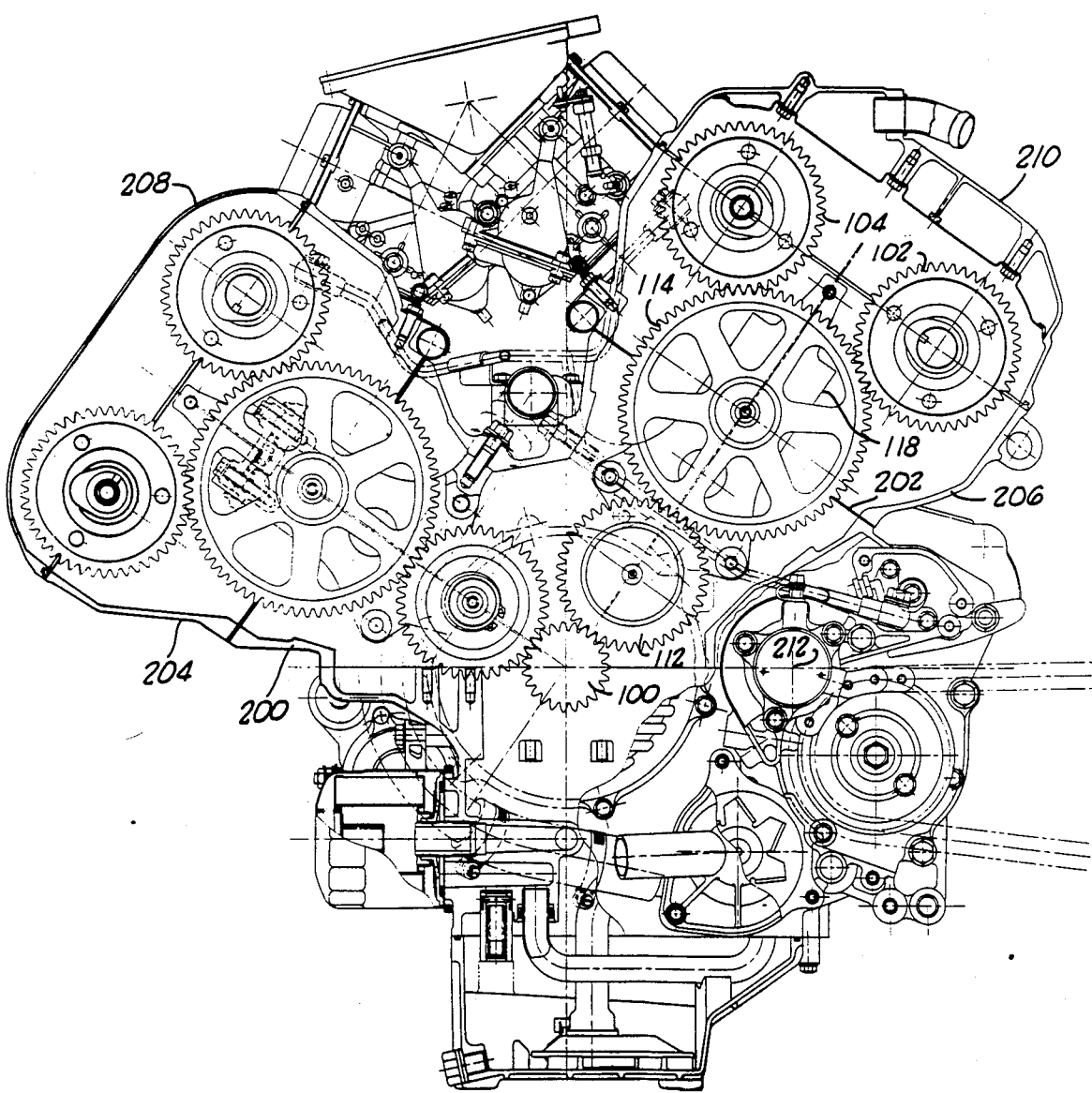
FIG. 12 is a broken away end view illustrating the drive train for overhead cams in a transversely mounted V-type internal combustion engine.

FIG. 12 better illustrates the environment within which the mechanisms of the present invention are to be employed. Once again, corresponding reference numerals are associated with similar components. Two banks of cylinders 200 and 202 extend in a V-arrangement to receive heads 204 and 206 with valve covers 208 and 210. The crankshaft 100 is shown to be adjacent the center of the main shaft of a transmission at 212. The idle gears 112 and 114 are held by gear retainer 118 with power directed through the crankshaft 100 and the idle gear wheels 112 and 114 to the camshafts 102 and 104.

Thus, improved camshaft drive trains are disclosed which provide for a more compact engine/transmission unit design and backlash adjustment means. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A V-type four-cycle engine having overhead camshafts and a crankshaft, comprising
   idle gear trains, each said idle gear train extending between the crankshaft and a camshaft and including idle gears, and a gear retainer having first and second axles for rotatably mounting said idle gears, said first axle including a journal portion having a cylindrical surface about a first axial centerline and mounting portions having a cylindrical surface about a second axial centerline displaced from said first axial centerline, said mounting portions being supported by said gear retainer, and means for retaining said journal portion in selectable angular orientation with respect to said gear retainer.

2. The V-type four cycle engine of claim 1 wherein said idle gear trains are located between the cylinders in each bank of cylinders.

3. The V-type four cycle engine of claim 1 further comprising a transmission having a main shaft parallel to the crankshaft and laterally disposed therefrom.

4. The V-type four cycle engine of claim 1 wherein each idle gear train includes two idle gears, the smaller of said idle gears engaging the crankshaft and the larger of said idle gears engaging the camshaft.

5. The V-type four-cycle engine of claim 1 wherein there ar two camshafts for each bank of cylinders directly meshing with one of said idle gears.

6. The V-type four cycle engine of claim 1 wherein said retaining means includes an arm fixed to and extending laterally from said first axle, a spring extending between a distal portion of said arm and said gear retainer and locking means for fixing said arm relative to said retainer.

7. A V-type four cycle engine having overhead camshafts and a crankshaft, comprising
   idle gear trains, each said idle gear train extending between the crankshaft and a camshaft and including idle gears, and a gear retainer having first and second axles for rotatably mounting said idle gears, said first axle including a journal portion having a cylindrical surface about a first axial centerline and mounting portions having a cylindrical surface about a second axial centerline displaced from said first axial centerline, said mounting portions being supported by said gear retainer, and means for retaining said journal portion in selectable anguler orientation with respect to said gear retainer, said means for retaining said journal portion including a radially outwardly extending flange having holes therethrough, anchor holes positioned in said gear retainer for selective alignment with said holes in said flange and an anchor pin extending through a selected anchor hole and hole in said flange.

* * * * *